United States Patent [19]

Fukuhara et al.

[11] Patent Number: 4,472,033
[45] Date of Patent: Sep. 18, 1984

[54] ZOOM LENS HAVING AN AUTOMATIC FOCUS DETECTING DEVICE

[75] Inventors: Toru Fukuhara, Isehara; Kunio Konno, Yokohama, both of Japan

[73] Assignee: Nippon Kogaku K.K., Tokyo, Japan

[21] Appl. No.: 389,938

[22] Filed: Jun. 18, 1982

[30] Foreign Application Priority Data

Jun. 24, 1981 [JP]  Japan .................................. 56-96756

[51] Int. Cl.³ .............................................. G02B 7/11
[52] U.S. Cl. ..................................... 350/429; 354/403
[58] Field of Search .................. 350/429, 430; 354/25, 354/197, 195

[56] References Cited

U.S. PATENT DOCUMENTS 4,346,967  8/1982  Komoto et al. ...................... 350/430
4,351,590  9/1982  Hirata et al. ....................... 354/25 A Primary Examiner—John K. Corbin
Assistant Examiner—Lynn Vandenburgh
Attorney, Agent, or Firm—Shapiro and Shapiro

[57] ABSTRACT

A zoom lens provided with a first group lens having a negative power and a second group lens having a positive power, the first group lens being moved in the direction of the optical axis for focus adjustment, the first group lens and the second group lens being moved in the direction of the optical axis for zooming, includes means for detecting the focused condition of the zoom lens to an object, the detecting means including optical means for receiving a light beam from the object which is discrete from a light beam incident on the zoom lens, and means for making an output signal representative of the focused condition from the light beam passed through the optical means, and means for integrally supporting the detecting means and the first group lens for conjoint movement in the direction of the optical axis.

4 Claims, 5 Drawing Figures

ZOOM LENS HAVING AN AUTOMATIC FOCUS DETECTING DEVICE

BACKGROUND OF THE INVENTION

1. Field of the Invention

This invention relates to a zoom lens having an automatic focus detecting device contained therein.

2. Description of the Prior Art

In recent years, numerous automatic focus detecting devices have been proposed in the optical devices of photographic cameras or the like, and zoom lenses incorporating automatic focus detecting devices in the zoom lens structure are known.

Consider an auto focus zoom lens provided with an optical system discrete from a picture-taking optical system as an optical system for automatic focus detection. Also, consider a compact zoom lens which comprises two groups, namely, a first group of negative power and a second group of positive power, which cover a wide angle to a medium focus condition.

In constructing an auto focus zoom lens of the above-described combination, a focusing error occurs during a zooming operation for the reason set forth hereinafter unless the arrangement of the optical system for automatic focus detection satisfies certain conditions, and thus resultant photographs are out of focus. Moreover, this phenomenon occurs even in a zoom lens in which the automatic focus detecting device has no detection error.

SUMMARY OF THE INVENTION

It is an object of the present invention to provide a zoom lens barrel provided with an automatic focus detecting device which produces no detection error at any focal length.

The zoon lens barrel according to the present invention is provided with a first lens group having a negative power and a second lens group having a positive power, the first lens group being moved for focusing, and the first and second lens groups being moved for zooming. In the present invention, the focus detecting device is supported integrally with the first lens group of the zoom lens barrel and is moved with the first lens along the direction of the optical axis.

The invention will become more fully apparent from the following detailed description thereof taken in conjunction with the accompanying drawings.

DESCRIPTION OF THE PREFERRED EMBODIMENTS

Before describing embodiments of the present invention, the principle of a two-group zoom lens will first be described by reference to FIGS. 1A and 1B.

Figure 1A:
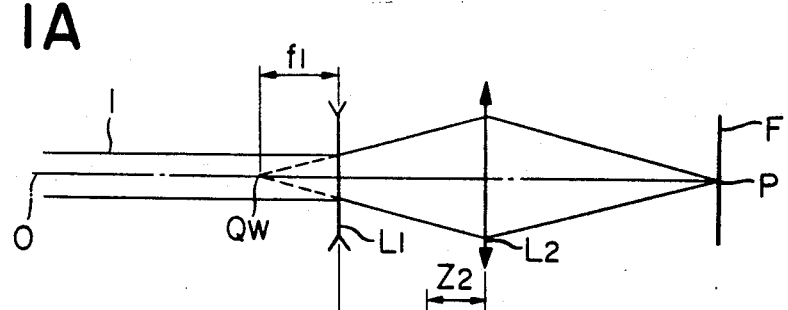
FIG. 1A is a view of the optical path showing a two-group zoom lens set to the condition of the short focal length.

FIG. 1A shows a condition in which this zoom lens is set to a short focal length and images a parallel light beam 1 from infinity on a film surface F. FIG. 1B shows a condition in which this zoom lens is set to a long focal length and images the parallel light beam 1 from infinity on the film surface F. When zooming is effected from the short focal length to the long focal length, a first lens group $L_1$ (lens unit) of negative power is moved by $Z_1$ toward the film surface F and a second lens group $L_2$ (lens unit) of positive power is moved by $Z_2$ in the opposite direction.

The position at which the parallel light beam 1 from infinity is formed as a virtual image by the first group lens $L_1$, namely, the point conjugate with infinity with respect to the first group lens $L_1$, is $Q_w$ in the case of the short focal length and $Q_t$ in the case of the long focal length. These points $Q_w$ and $Q_t$ are conjugate with the center P of the film surface F with respect to the second lens group $L_2$. The imaging magnification with respect to the second group lens $L_2$ differs, whereby the imaging condition for the light 1 from infinity is varied and thus, zooming is accomplished. As is evident from these facts, the distances $\overline{Q_w L_1}$ and $\overline{Q_t L_1}$ between the points $Q_w$, $Q_t$ and the first lens group $L_1$ are equal to the focal length $f_1$ of the first lens group.

When the object to be photographed lies at a finite distance, the first lens group $L_1$ is moved, for example, in the condition of the short focal length, by a predetermined amount from the position of FIG. 1A in accordance with the object distance by a focusing operation, whereby the focus of the lens $L_1$ is adjusted. When a zooming operation is effected from this focus-adjusted condition, the first lens group $L_1$ and the second lens group $L_2$ are moved by the same amounts $Z_1$ and $Z_2$ as in the case of the infinity object, whereby the long focal length is obtained. In this zooming operation, the object image should always be formed on the film surface F, but strictly, the image plane becomes deviated as described in detail by reference to FIG. 2. Particularly, this deviation becomes significant when zooming is effected to the condition of the long focal length with the lens focused in the condition of the short focal length or when an object point S lies at a short distance.

Figure 2A:
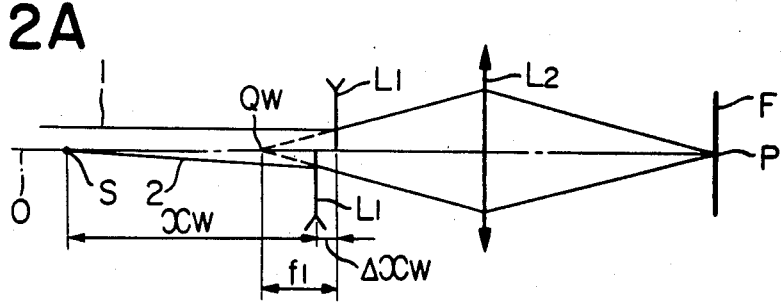
FIG. 2A is a view of the optical path comparatively showing the focused conditions of the zoom lens set to the short focal length with respect to objects at infinity and a finite distance.
Figure 2B:
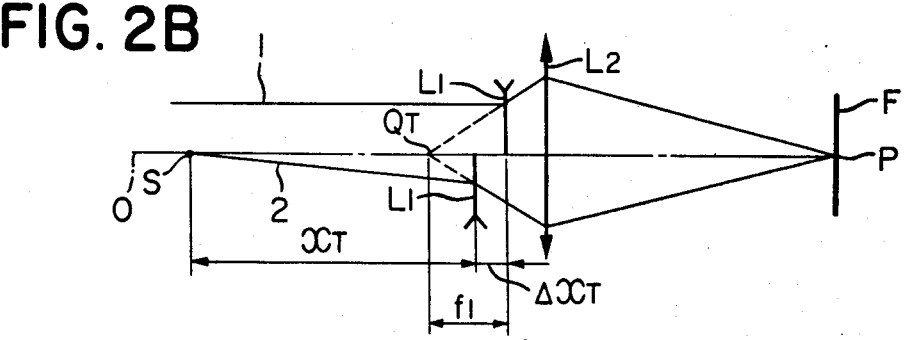
FIG. 2B is a view of the optical path comparatively showing the focused conditions of the zoom lens set to the long focal length with respect to objects at infinity and a finite distance.

In FIGS. 2A and 2B, the focused condition to infinity at the short focal length and the long focal length and the focused condition to the object point S at a certain finite distance are shown on the upper and lower sides of the optical axis 0. That is, both of the light 1 from infinity and the light 2 from the object point S are imaged on a central point P by movement of the first group lens $L_1$.

Description will now be made with FIG. 2A taken as an example. In the case of the focused condition to the object point S, the first lens group $L_1$ is positioned by a displacement amount $\Delta X_w$ more toward the object side than in the case of the focused condition to infinity, and the object point S and the point $Q_w$ are conjugate with respect to the first lens group $L_1$ at this position.

Accordingly, if it is assumed that the distance between the first lens group $L_1$ focused to the object point S and the object point S is $X_w$, then from the equation of imaging, $$\frac{1}{L_1 S} + \frac{1}{L_1 Q_w} = \frac{1}{f_1} \quad (1)$$

$$\therefore \frac{1}{X_w} + \frac{1}{f_1 - \Delta X_w} = \frac{1}{f_1}$$

If equation (1) is solved to seek $\Delta X_w$, $$\Delta X_w = \frac{f_1^2}{f_1 - X_w} \quad (2)$$

Also, if the displacement amount $\Delta X_t$ is likewise sought with respect to the case of the long focal length of FIG. 2B, $$\Delta X_t = \frac{f_1^2}{f_1 - X_t} \quad (3)$$

Figure 1B:
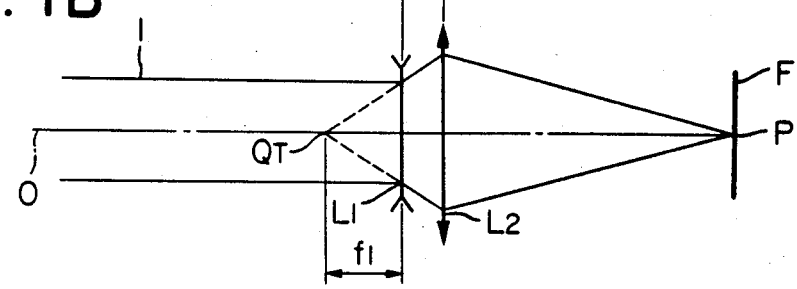
FIG. 1B is a view of the optical path showing the zoom lens set to the condition of the long focal length.

However, as is clear in FIGS. 1A and 1B, the first lens group $L_1$ has been moved by $Z_1$ toward the film surface F side during the zooming in which the focal length is increased and therefore, $$X_t > X_w \quad (4)$$

Accordingly, from formulas (2), (3) and (4), it will be seen that $$\Delta X_t > \Delta X_w \quad (5)$$

From formula (5), it has become apparent that during zooming, the focus cannot be made accurately coincident with the film surface F unless the displacement amount $\Delta X$ of the first lens group $L_1$ is also varied for the same object point S.

That is, even if the focus is adjusted at a certain focal length with respect to the same object, if a zooming operation is effected therefrom, the focus will become deviated. In such a zoom lens, if use is made of a focus detecting device which measures the light passed through this zoom lens, i.e., the picture-taking lens and detects the focus on the basis thereof, any focus deviation resulting from the zooming operation can be detected and therefore, proper automatic focusing operation is always possible. However, it is actually difficult to incorporate into a zoom lens structure a focus detecting device of the above-described type which measures the light passed through the picture-taking lens. Therefore, there is no other choice than to incorporate into the zoom lens structure a focus detecting device which detects the focus from the object light which is not the light passed through the picture-taking lens. Where such focus detecting device is provided on the fixed portion of the lens structure, automatic focusing is possible with respect to a certain focal length for the reason set forth above, but if a zooming operation is effected therefrom to vary the focal length, the focus will become deviated.

Figure 3:
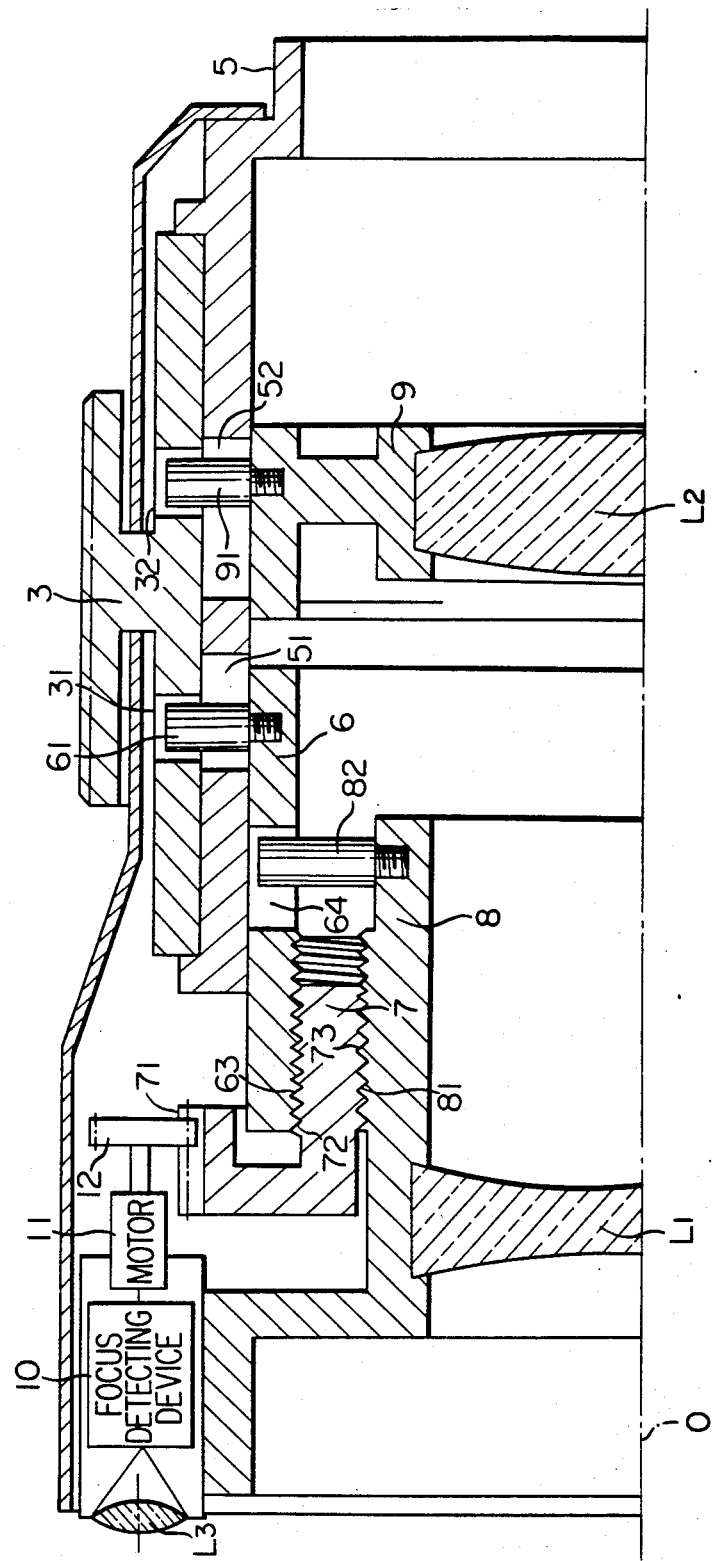
FIG. 3 shows an embodiment of the device according to the present invention.

FIG. 3 shows an embodiment of the present invention which overcomes these disadvantages and which is constructed so as to produce no detection error at any focal length.

A first lens group $L_1$ and a second lens group $L_2$ are movable in the direction of the optical axis for focus adjustment and zooming as described in connection with FIGS. 1 and 2. The first and second lens groups $L_1$ and $L_2$ are shown as single lenses, but each of them may of course comprise a plurality of lenses. When an operating ring 3 is manually rotated in the case of zooming, cams 31 and 32 provided on the ring 3 and having components in the direction of the optical axis and the circumferential direction cause pins 61 and 91 engaged by these cams to be moved in the direction of the optical axis along straight grooves 51 and 52 formed in a fixed cylinder 5 fixedly held by a camera (not shown). Accordingly, a ring 6, in which the pin 61 is studded, and a ring 9, in which the pin 91 is studded, are moved in the direction of the optical axis 0 by an amount determined by the shapes of the cams 31 and 32 and the angle of rotation of the operating ring 3. Ring 6 is threadedly engaged with rings 7 and 9 by a helicoid (to be described). Accordingly, movement of ring 6 along the optical axis causes like movement of rings 7 and 8. The rings 8 and 9 support the first lens group $L_1$ and the second lens group $L_2$, respectively, and thus zooming is effected.

Secured to the ring 8 is a focus detecting device 10 for detecting the focused conditions of the lenses $L_1$ and $L_2$ to the object from the condition of the image of the object formed on a photoelectric conversion element array by a lens system $L_3$ and producing a drive signal for moving the lens $L_1$ toward its in-focus position. Such focus detecting device itself is of a known construction as shown, for example, in U.S. Pat. No. 3,838,275 or U.S. Pat. No. 4,264,810.

When zooming is effected and the ring 8 is moved, the lens $L_3$ and focus detecting device 10 fixedly supported by the ring 8 are also of course moved in the direction of the optical axis. Accordingly, the focus detecting device 10 which has detected the in-focus before zooming and has stopped the first lens group $L_1$ effects the re-detecting operation by the movement accompanying the zooming and causes a motor 11 and a gear 12 to rotate until the in-focus condition is achieved and therefore, causes the ring 7 provided with a gear 71 in a portion thereof to rotate. The inner helicoid 63 of the ring 6 is fitted to the outer helicoid 72 of the ring 7, and the inner helicoid 73 of the ring 7 is fitted to the outer helicoid 81 of the ring 8, and a pin 82 studded in the ring 8 is fitted in a straight groove 64 extending in the direction of the optical axis and formed in the ring 6, whereby a translating helicoid mechanism is formed by all these, and therefore the first lens group $L_1$ is moved rectilinearly in the direction of the optical axis and the focus deviation created by the zooming is corrected and thus, a proper focus is obtained.

In this manner, the first lens group $L_1$ for focus adjustment is always driven so as to correct any focus deviation resulting from zooming and therefore, it becomes possible to obtain photographs properly focused at any focal length.

The focus detecting device 10 may be of the type which measures the distance to the object, or the type which measures the sharpness of the object image by the lens system $L_3$, or any other type.

We claim:

1. A zoom lens provided with a first lens unit having a negative power and a second lens unit having a positive power, said first lens unit being moved in the direction of the optical axis for focus adjustment, said first lens unit and said second lens unit being moved in the direction of the optical axis for zooming, said zoom lens comprising:

(a) means for detecting the focused condition of said zoom lens to an object, said detecting means including optical means for receiving a light beam from said object which is discrete from a light beam incident on said zoom lens, and means for producing an output signal representative of said focused condition from the light beam passed through said optical means; and (b) means for integrally supporting said detecting means and said first lens unit for conjoint movement in the direction of the optical axis.

2. The zoom lens according to claim 1, wherein said detecting means is disposed outside said first lens unit by said supporting means.

3. The zoom lens according to claim 1, further comprising first lens barrel means for holding said first lens unit, second lens barrel means for holding said second lens unit, operating means coupled to said first and second lens barrel means and enabling the movement of said first and second lens barrel means in the direction of the optical axis for said zooming, and drive means for moving said first lens barrel means in the direction of the optical axis in response to the output signal of said detecting means.

4. The zoom lens according to claim 3, wherein said detecting means is provided integrally with said first lens barrel means for conjoint movement in the direction of the optical axis.

* * * * *